(12) United States Patent
Palacios et al.

(10) Patent No.: US 8,665,576 B2
(45) Date of Patent: Mar. 4, 2014

(54) FUSE CIRCUITS

(75) Inventors: Marc Bautista Palacios, Barcelona (ES); Lorena Fernández Llorens, Barcelona (ES); Jordi Hernandez Creus, Granollers Barcelona (ES); Juan Luis López Rodríguez, Subirats Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/559,984

(22) Filed: Jul. 27, 2012

(65) Prior Publication Data

US 2014/0029151 A1    Jan. 30, 2014

(51) Int. Cl.
*H02H 5/04* (2006.01)

(52) U.S. Cl.
USPC .......................................................... 361/104

(58) Field of Classification Search
USPC .......................................................... 361/104
See application file for complete search history.

(56) References Cited

U.S. PATENT DOCUMENTS

| | | | |
|---|---|---|---|
| 3,017,558 A * | 1/1962 | Kozacka | 363/53 |
| 4,295,174 A * | 10/1981 | Peterson et al. | 361/16 |
| 5,341,267 A * | 8/1994 | Whitten et al. | 361/56 |
| 5,592,353 A | 1/1997 | Shinohara | |
| 6,477,025 B1 * | 11/2002 | Goldbach et al. | 361/103 |
| 6,815,841 B1 * | 11/2004 | Brown et al. | 307/10.1 |
| 6,829,129 B2 * | 12/2004 | Marsh et al. | 361/111 |
| 6,934,135 B1 | 8/2005 | Ryan | |
| 8,405,945 B2 * | 3/2013 | DiMarco et al. | 361/93.1 |
| 2003/0095369 A1 * | 5/2003 | Knoedgen | 361/104 |
| 2005/0036260 A1 * | 2/2005 | Nakamura et al. | 361/104 |
| 2006/0262713 A1 | 11/2006 | Karam | |
| 2007/0201177 A1 * | 8/2007 | Kladar et al. | 361/118 |
| 2010/0097733 A1 * | 4/2010 | E. | 361/42 |
| 2012/0014022 A1 | 1/2012 | Lin | |

FOREIGN PATENT DOCUMENTS

CN  1722559 A   1/2006
KR  20040104213  12/2004

OTHER PUBLICATIONS

Wright, R.G., Sep. 2008, IEEE AUTOTESTCON 2008, Multiresolution Sensor Fusion Approach to PCB Fault Detection and Isolation (6 pages).

* cited by examiner

*Primary Examiner* — Dharti Patel

(57) ABSTRACT

A power supply circuit has parallel supply and control branches each with fuses, the power supply branch comprising at least one replaceable fuse. The supply branch is connected to one or more electrical components of an electrical device, such as the actuator and sensors of a printer, and the supply branch is connected to control or monitoring components. A circuit comprising lights indicates correct or faulty operation of the various parts of the supply circuit.

19 Claims, 3 Drawing Sheets

FUSE CIRCUITS

BACKGROUND

When an electrical component protected by a fuse circuit fails, the entire circuit including the fuse often needs to be replaced. Subsequently detecting the nature and/or the results of the faults can be a complex and time-consuming procedure.

DETAILED DESCRIPTION OF THE EMBODIMENTS

Figure 1:
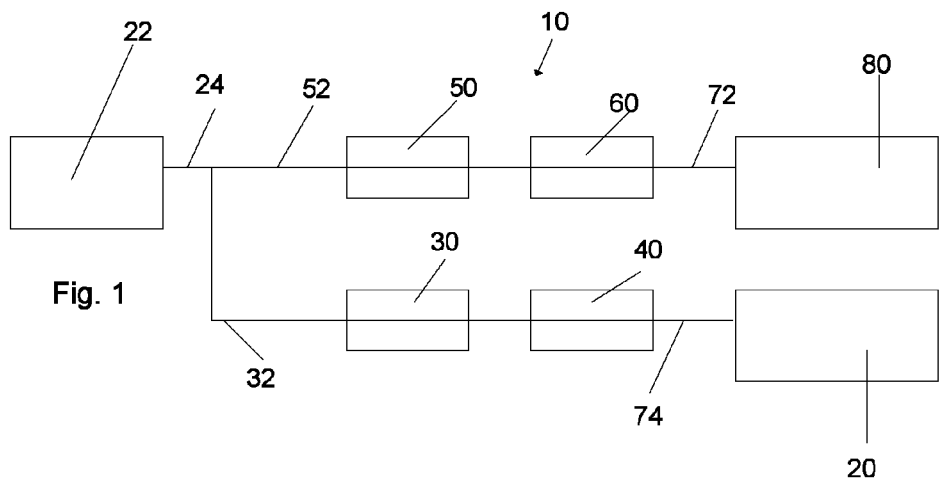
FIG. 1 shows a power supply circuit in accordance with an embodiment.

FIG. 1 shows a power supply circuit 10 for supplying a voltage at 74 to external sensors and/or actuators. The sensors and/or actuators are for one or more external parts of an external system 20. Each external part may be an electrical or electromechanical device such as a motor, fan, pump, valve or heater. The external system may be a hard-copy device such as a printer.

An input voltage source 22 is connected to the input 24 of a power connector fuseboard comprising electrical fuse components 30, 40, 50 and 60. The input voltage is supplied to two circuit branches namely a power supply branch 32 and a control branch 52. The control branch supplies a voltage at 72 for a printed circuit assembly (PCA) 80 of internal electronics for controlling the sensors and/or actuators of the external parts.

Fuse components 40, 50 and 60 are surface mounted devices embedded on the power connector fuseboard. They are all slow blow fuses. Fuse component 30 is a replaceable fuse and is a fast blow fuse.

Some existing protection circuits are based on common fuses for both PCA 80 and external system 20 or without any protection at all and relying on the external system. In both cases, if the external system is burnt and its failure mode is a short-circuit, both PCA and external system need to be replaced increasing the repair cost. Furthermore, as the communication between the burnt PCA and the main electronics usually is lost, as there is no power in the burnt PCA, the diagnostics of those systems increases in complexity. In cases where power communication with the PCA is lost, further diagnostic activity may be impossible.

One of the contributing factors to the failure rate are fuses blown due to high currents and short-circuits created by external parts that are managed by the PCA 80. A significant amount of PCAs are replaced, not due to the PCA internal failure, but due to external parts failure that generate an internal failure of the PCA.

Thus it will be seen that the above-described embodiment splits the input voltage rail used for both internal parts control and internal PCA electronics in two. The rail 52 in charge of supplying the voltage to the internal electronics consists of a configuration of only SMD (surface mount) fuses 50, 60. The rail 32 in charge of supplying the voltage to the external parts includes a replaceable fuse 30. In this circuit, the second fuse 40 in the rail 32 is not blown in case of a particular failure of any external part.

In some prior circuits, in order not to lose the communication between the burnt PCA and the main electronics, one SMD fuse was provided for each external part. Although this has the advantage of keeping the communication between the PCA and the main electronics, it has a drawback that, in case of external part failure, both PCA and actual fuses need to be replaced. Also, for a plurality of parts, this is not a cost effective solution as one fuse is needed per each external part. Thus an advantage of the above-described circuit is that only a single fuse component 30 needs to be replaced.

The above-described circuit reduces the failure rate of components of the external system, which for certain devices such as large format printers, can be very expensive. The circuit 10 ensures that, in the case of failure of an external part, only that external part and the fuse 30 need to be replaced instead of the complete PCA.

Figure 2:
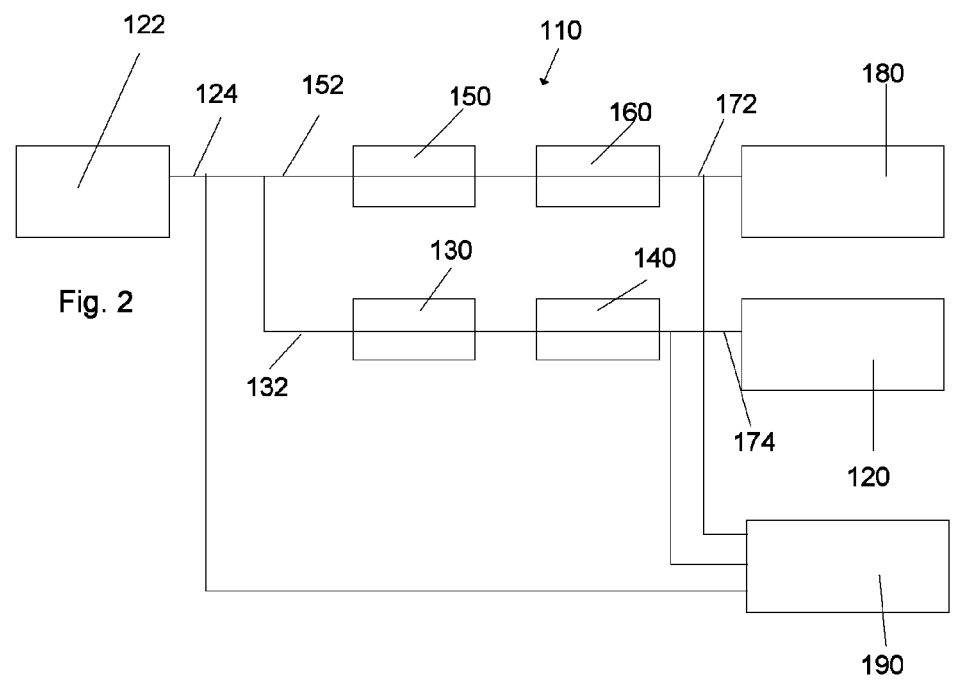
FIG. 2 shows a power supply circuit in accordance with an embodiment and comprising a monitoring circuit.

FIG. 2 shows a power supply circuit 110 for supplying a voltage at 174 to external sensors and/or actuators. Components corresponding to components shown in FIG. 1 are designated by the same reference numeral plus 100. Circuit 110 also comprises a supply voltage monitoring circuit or monitoring module 190 which comprises a CPU, a microcontroller or any other suitable monitoring arrangement. The monitoring circuit 190 is configured to detect the supply voltage at 174 for the external parts whenever there is a charge of state of any external part. The monitoring circuit is configured, in addition, to detect the supply voltage periodically.

Figure 3:
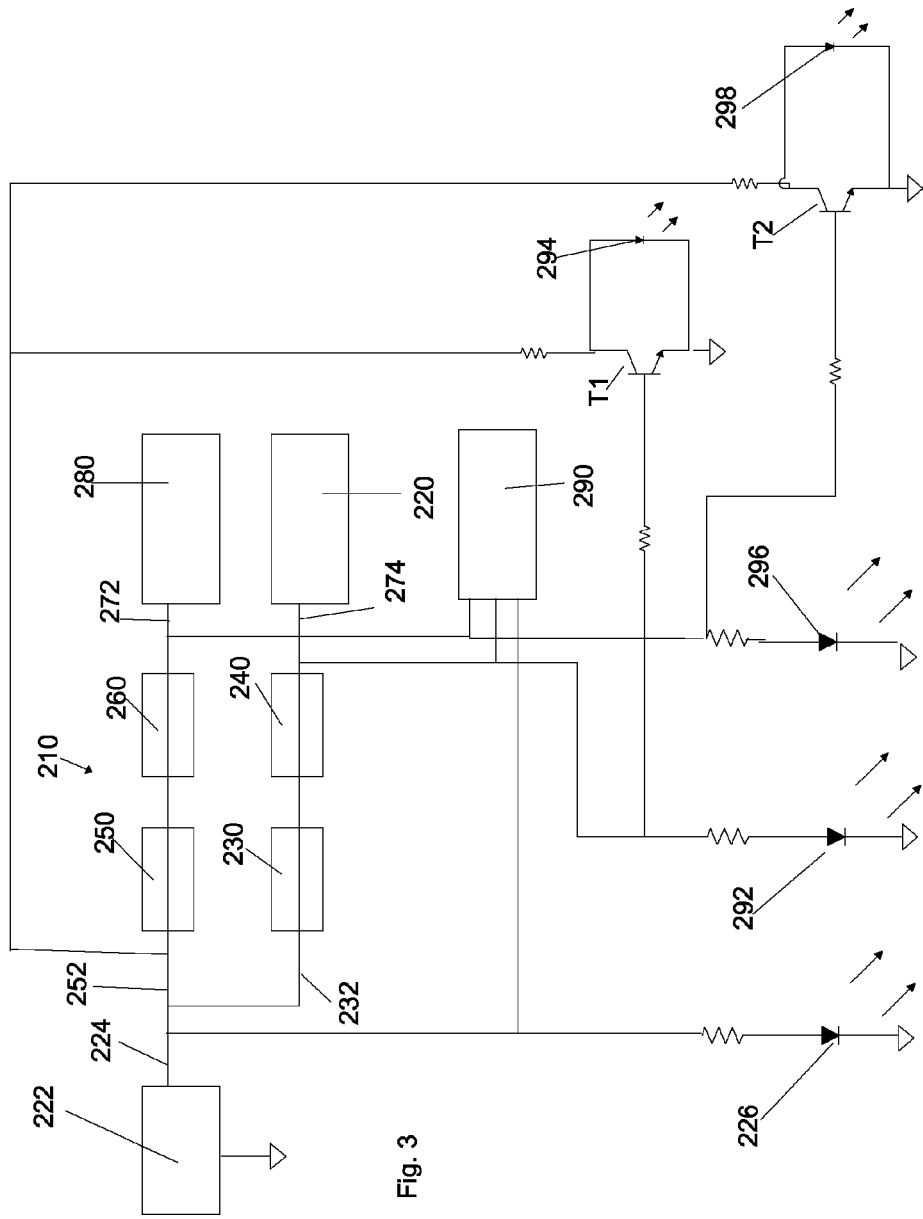
FIG. 3 shows a power supply circuit in accordance with an embodiment and comprising visual status-indicating components.

FIG. 3 shows a power supply circuit 210 for supplying a voltage at 274 to external sensors and/or actuators. Components corresponding to components shown in FIG. 2 are designated by the same reference numeral plus 100. Circuit 210 also comprises circuitry 226 configured to act as a local reporting system by providing a visual status indication in respect of the operation of the external power supply voltage rail 232 and the internal PCB supply voltage rail 252. Two respective LEDs (one green, one red) indicate the status of each rail.

The correct operation of the external PCA is indicated by a green LED 292 connected between the supply voltage at 274 and ground.

A fault in this supply voltage is indicated by a red LED 294 connected across a transistor T1 connected between the input 224 and ground. The gate of the transistor T1 is connected to the supply voltage at 274 so that the operation of the transistor and LED 294 is controlled thereby.

The correct operation of the internal PCA is indicated by a green LED 296 connected between the supply voltage at 292 and ground.

A fault in is supply voltage is indicated by a red LED 298 connected across a transistor T2 connected between the input 224 and ground. The gate of the transistor T2 is connected to the supply voltage at 272 so that the operation of the transistor T2 and LED 298 is connected thereby.

The reporting circuitry 226 functions as follows under different operating conditions.

System Working Properly

In this case all supply voltages are switched on. That means that the supply voltage monitoring does not detect any voltage below the specifications and all green LEDs in charge of voltage reporting are switched on while the red LEDs are switched off.

Internal PCA 280 Failure

The SMD fuses 250 and/or 260 are blown and therefore only the PCA 280 needs to be replaced, which is the damaged part. In this case, the communication with the main electronics is lost. In this case the green LED 296 indicating the internal electronics is switched off and the red LED 298 indicating failure in the internal electronics is switched on.

External Part 220 Failure

In case of external part failure, that creates a high current or a short-circuit and the fuse that is blown is the replaceable fuse 230. One of the advantages of the current system is that the internal electronics 280 keeps the voltage alive and therefore it can continue working. In this case the monitoring circuit 290 detects that the external parts voltage 274 is down and informs the main electronics. Therefore the main electronics is able to conclude that upon a particular event occurring (like switching on an external part) the supply voltage current was higher than expected, pointing clearly to the failing part.

Also, the visual indication circuitry 226 is actuated such that it makes the green LED 292 for the external part supply voltage switch off and the external part supply voltage red LED 294 switch on. The repair required is only replacement of the failing part and of fuse 230.

Power Supply Input Voltage Failure

If the failure comes from the input supply voltage 222, the power diagnostics are able to detect this failure. Nevertheless, and as a way of improving the diagnostics, the PCA also indicates this by switching off all the LEDs indicating that the problem is not in the PCA but in somewhere else.

The above explanation is summarised in Table 1.

| LED Ref. No. | LED Description | OK | Internal PCA failure | External part failure | Power supply input voltage failure |
|---|---|---|---|---|---|
| 296 | 24 V Internal PCA GREEN | ON | OFF | ON | OFF |
| 298 | 24 V Internal PCA RED | OFF | ON | OFF | OFF |
| 292 | 24 V External part GREEN | ON | ON | OFF | OFF |
| 294 | 24 V External part RED | OFF | OFF | ON | OFF |

Figure 4:
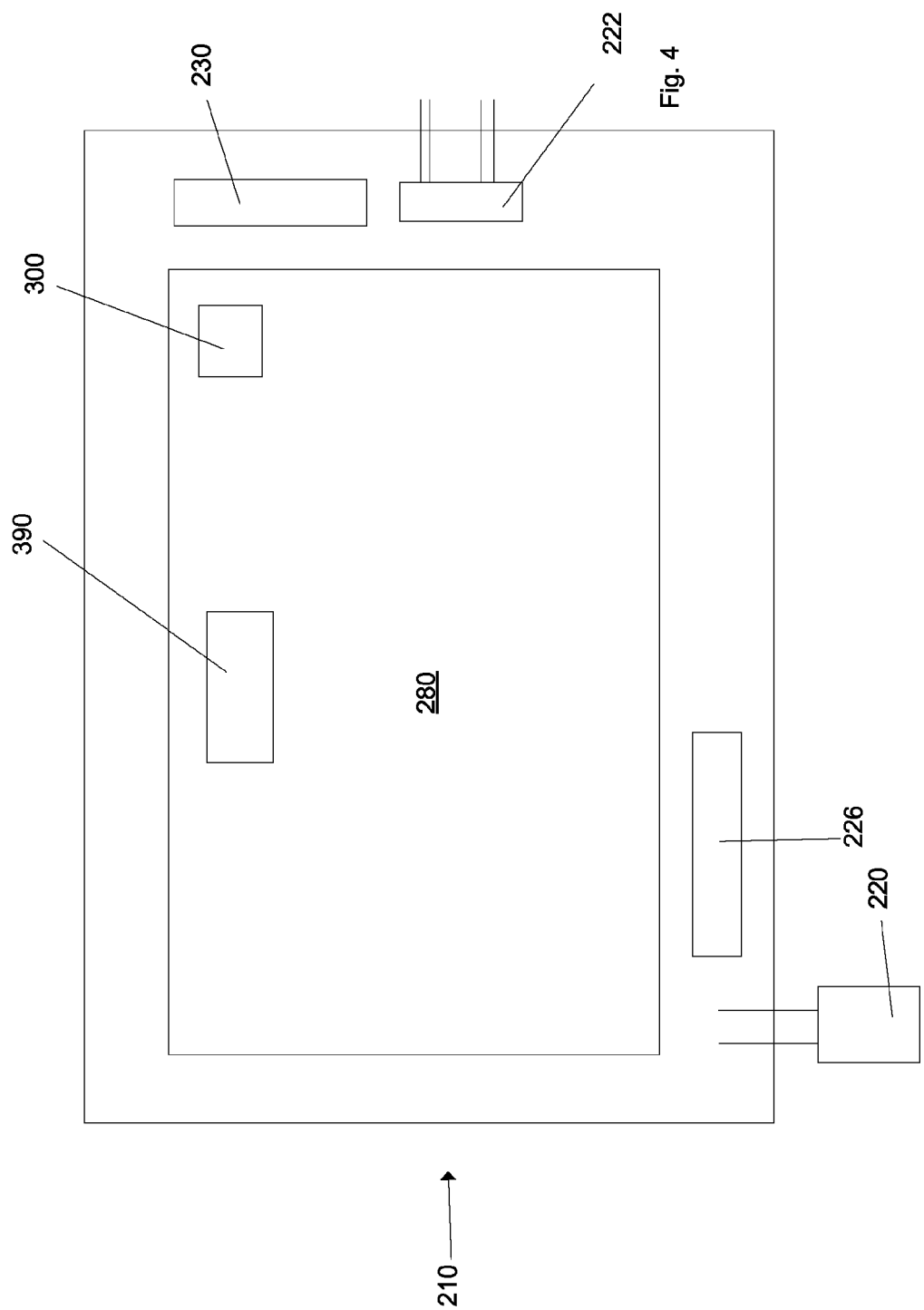
FIG. 4 shows a schematic representation of a physical arrangement of the parts of the circuit of FIG. 3.

FIG. 4 is a schematic representation showing the relative locations of some of the parts of the circuit of FIG. 3 in a supply circuit for a large-format printer including an actuator 220. Monitoring circuit 290 is located in a region 390 of the PCA 280. Fuse components 240, 250 and 260 are fuses embedded in an area 300 of the PCA 280. Fuse component 230 is removably attached adjacent an edge of the PCA so that it can be readily replaced if required. The LED indicator circuit 226 is located adjacent another edge of the PCA where the LEDs can be see through corresponding openings in an adjacent housing wall.

The above-described circuit has various advantages. It reduces the number of different device parts to change and also reduces the amount of different fuses to replace. Thus repair costs are reduced. In addition, the diagnostics function is improved because, in case of external part failure, the PCA remains completely active. Serviceability of the parts is improved as the number of parts to replace is reduced as well as the diagnostic ability is able to identify the correct failing part. It represents a cost-effective solution compared to other ones requiring one fuse for each version of actuator.

In any of the above-described circuits the replaceable fuse component 30, 130, 230 can comprise two fuses arranged in parallel paths.

Although fuse components 40, 50, 60, 140, 150, 160, 240, 250 and 260 have been disclosed as surface mount fuses, they can each be replaced by any other suitable type of fuse. In particular they can each comprise a replaceable fuse, but such an arrangement is less compact.

In the above described circuits, each of the branches 32, 52, 132, 152, 232, 252 comprises two fuse components arranged in series. The rating of each of the fuse components is preferably 4 Amps. The line voltage of each of the branches is preferably 24 volts. An advantage of this combination of values allows the arrangement to be operated as a Limited Power Source system, which is limited to 100 VA. It is noted that the product of 24V and 4 A is 96 VA which is less than 100 VA. A resulting advantage of this is that a fire enclosure is not required.

If desired, each of the branches 32, 52, 132, 152, 232, 252 can comprise only a single fuse. However, a second fuse in each branch is advantageous in case the first fuse is short circuited for some reason. The second fuse may have a rating higher than 4 Amps. The requirement is that the power line should be limited to 250 VA in this case.

The LEDs 292-298 can be replaced by other light-emitting devices if desired. Additional status-indicating light-emitting devices may be provided if desired. Alternatively, one or more of the described light-emitting devices may be omitted. The colours of the light-emitting devices may be selected as desired.

Other indicating means can be employed in addition or instead. For example, audible indicators can be used such as buzzers having different sounds.

Preferred embodiments of the present invention comprise a power supply circuit comprising an input power supply line which is connected to parallel supply and control branches, each branch including one or more respective fuse components, wherein at least one of the fuse components in the power supply branch is a replaceable fuse. The or each fuse component in the control branch can be a non-replaceable fuse such as a surface mount fuse. The power supply branch can comprise one or more non-replaceable fuses in series with said replaceable fuse component.

The power supply circuit preferably further comprises monitoring and indicating circuitry which is configured to monitor and to provide an indication of the operation in the circuit.

The circuit can comprise a first indicator configured to indicate correct operation of the power supply branch and a second indicator configured to indicate faulty operation of the power supply branch. The circuit can alternatively comprise a first indicator configured to indicate correct operation of the control branch and a second indicator configured to indicate faulty operation of the control branch. The circuit can alternatively comprise a first indicator configured to indicate correct operation of the power supply branch, a second indicator configured to indicate faulty operation of the power supply branch, a third indicator configured to indicate correct operation of the control branch and fourth indicator configured to indicate faulty operation of the control branch.

Preferred embodiments of the invention comprise a circuit for monitoring operation of a supply circuit having first and second branches, the first branch comprising one or more fuses and being configured to provide a voltage to one or more electrical components of an external device and the second branch comprising one or more fuses and being configured to provide a voltage to control or monitoring components, wherein a plurality of indicators are connected to the fuses, the indicators being configured to provide respectively different indications for correct operation of the circuit, for failure of the control or monitoring components, for failure of an electrical component of the external device and for failure of an input to the circuit. First and second indicators can be connected to be actuated by the output of the fixed branch to indicate correct and faulty operation, respectively, of the external device, and third and fourth indicators can be connected to be actuated by the output of the second branch to indicate correct and faulty operation, respectively, of the control or monitoring components. The first branch can comprise at least one replaceable fuse and the second branch can comprise at least one non-replaceable fuse.

Preferred embodiments of the invention comprise a device comprising an electrical component and a fused supply circuit to the electrical component, the supply circuit comprising first and second branches respectively connected to the electrical component and to a monitoring circuit, each of the branches including one or more respective fuse components, wherein at least one fuse component in the first branch is a replaceable fuse component. The device may further comprise a plurality of indicators connected to the fuse components, the indicators being configured to provide respectively different indications for correct operation, for failure of the device and/or the first branch, for failure of the monitoring circuit and/or the second branch, and for failure of an input to the supply circuit.

The device can be a printer, in particular a large-format printer. The electrical component can be a motor, a fan, a pump, a valve, a heater or a sensor.

Although the present disclosure has been described with reference to certain embodiments, workers skilled in the art will recognize that changes may be made in form and detail without departing from the spirit and scope of the claimed subject matter. For example, although different embodiments and modifications may have been described as including one or more features providing one or more benefits, it is contemplated that the described features may be interchanged with one another or alternatively be combined with one another in the described embodiments or in other alternative embodiments.

What is claimed is:

1. A power supply circuit comprising:
   an input power supply line; and
   parallel supply and control branches connected to the input power supply line, each of the parallel supply and control branches including one or more respective fuse components, wherein at least one of the one or more fuse components in the supply branch is a replaceable fuse component, and at least one of the one or more fuse components in the control branch is a non-replaceable fuse component.

2. A power supply circuit according to claim 1, wherein the supply branch comprises one or more non-replaceable fuse components in series with said replaceable fuse component.

3. A power supply circuit according to claim 2, wherein the one or more non-replaceable fuse components of the supply branch blows slower than the replaceable fuse component.

4. A power supply circuit according to claim 1 further comprising monitoring and indicating circuitry configured to monitor and to provide an indication of an operation in the power supply circuit.

5. A power supply circuit according to claim 4 comprising a first indicator configured to indicate correct operation of the supply branch and a second indicator configured to indicate faulty operation of the supply branch.

6. A power supply circuit according to claim 4 comprising a first indicator configured to indicate correct operation of the control branch and a second indicator configured to indicate faulty operation of the control branch.

7. A power supply circuit according to claim 4 comprising a first indicator configured to indicate correct operation of the supply branch, a second indicator configured to indicate faulty operation of the supply branch, a third indicator configured to indicate correct operation of the control branch, and fourth indicator configured to indicate faulty operation of the control branch.

8. A power supply circuit according to claim 1, wherein the supply branch is configured to supply power to parts of a system, and the control branch is configured to supply a voltage to electronics that control the parts.

9. A power supply circuit according to claim 8, wherein the replaceable fuse component allows just a failed one of the parts and the replaceable fuse component to be replaced without replacement of the electronics.

10. A power supply circuit according to claim 1, wherein the non-replaceable fuse component is a surface mounted device.

11. A system comprising:
    a supply circuit having first and second branches, the first branch comprising one or more fuses and being configured to provide a voltage to one or more electrical components of an external device, and the second branch comprising one or more fuses and being configured to provide a voltage to control or monitoring components, wherein at least one of the one or more fuses in the first branch is a replaceable fuse, and at least one of the one or more fuses in the second branch is a non-replaceable fuse; and
    a monitoring circuit comprising a plurality of indicators connected to the fuses, the indicators being configured to provide respectively different indications for correct operation of the supply circuit, for failure of the control or monitoring components, and for failure of an electrical component of the external device.

12. A system according to claim 11, wherein the plurality of indicators include:
    first and second indicators connected to be actuated by an output of the first branch to indicate correct and faulty operation, respectively, of the external device, and
    third and fourth indicators connected to be actuated by an output of the second branch to indicate correct and faulty operation, respectively, of the control or monitoring components.

13. A system according to claim 11, wherein the control component is configured to control the external device.

14. A system according to claim 11, wherein the first branch further includes one or more non-replaceable fuses in series with the replaceable fuse.

15. A device comprising:
    an electrical component; and
    a fused supply circuit connected to the electrical component, the supply circuit comprising first and second branches respectively connected to the electrical component and to a monitoring circuit, each of the first and second branches including one or more respective fuse components, wherein at least one fuse component in the first branch is a replaceable fuse component, and at least one fuse component in the second branch is a non-replaceable fuse component.

16. A device according to claim 15, wherein the first branch further comprises at least one non-replaceable fuse component in series with the replaceable fuse component.

17. A device according to claim 15, wherein the second branch comprises at least two non-replaceable fuses connected in series.

18. A device according to claim 15 further comprising a first indicator configured to indicate correct operation of the first branch, a second indicator configured to indicate faulty operation of the first branch, a third indicator configured to indicate correct operation of the second branch, and a fourth indicator configured to indicate faulty operation of the second branch.

19. A device according to claim 15 wherein a plurality of indicators are connected to the fuse components, the indicators being configured to provide respectively different indications for correct operation, for failure of the device and/or the first branch, for failure of the monitoring circuit and/or the second branch, and for failure of an input to the supply circuit.

\* \* \* \* \*